(12) United States Patent
Huang

(10) Patent No.: US 8,854,720 B2
(45) Date of Patent: Oct. 7, 2014

(54) TRI WAVELENGTH DIFFRACTION MODULATOR AND A METHOD FOR MODULATION

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 197 days.

(21) Appl. No.: 13/540,356

(22) Filed: Jul. 2, 2012

(65) Prior Publication Data

US 2012/0268805 A1 Oct. 25, 2012

Related U.S. Application Data

(63) Continuation of application No. PCT/CN2010/080643, filed on Dec. 31, 2010.

(60) Provisional application No. 61/292,107, filed on Jan. 4, 2010.

(51) Int. Cl.
| | | |
|---|---|---|
| *G02B 26/00* | (2006.01) | |
| *G02B 27/42* | (2006.01) | |
| *G02B 5/18* | (2006.01) | |
| *G09G 5/00* | (2006.01) | |
| *G02B 26/08* | (2006.01) | |
| *G02F 1/21* | (2006.01) | |

(52) U.S. Cl.
CPC ............. *G02B 26/0808* (2013.01); *G02F 1/21* (2013.01)
USPC ........... 359/295; 359/245; 359/558; 359/572; 345/204; 345/690

(58) Field of Classification Search
CPC .... G02B 26/00; G02B 26/002; G02B 26/007; G02B 26/0808; G02B 5/18; G02B 5/1828; G02B 27/42; G09G 5/00; G09G 5/10
USPC .............. 359/290–295, 298, 227, 230, 223.1, 359/558, 565, 566, 569, 572, 576, 563; 345/204, 211, 690; 335/20, 87–90
See application file for complete search history.

(56) References Cited

U.S. PATENT DOCUMENTS 4,419,663 A * 12/1983 Kohashi ........................ 345/107
5,170,283 A * 12/1992 O'Brien et al. ............... 359/291
(Continued)

FOREIGN PATENT DOCUMENTS

| CN | 1645183 A | 7/2005 |
|---|---|---|
| CN | 1710459 A | 12/2005 |

(Continued)

OTHER PUBLICATIONS

International Search Report of International Application No. PCT/CN2010/080643, dated Dec. 31, 2010.
Chinese First Examination Report of corresponding China Application No. 201080060621.9, dated Oct. 31, 2013.

*Primary Examiner* — Loha Ben
(74) *Attorney, Agent, or Firm* — J.C. Patents

(57) ABSTRACT

The present invention relates to a tri wavelength diffraction modulator (TWDM) and a method of tri wavelength diffraction modulation. The tri wavelength diffraction modulator includes: a stationary substrate with a bottom electrode plate formed on top of the stationary substrate; a first electrode plate comprising a first suspended beam suspended in parallel above the stationary substrate and a first connection anchored onto the stationary substrate; and a second electrode plate comprising a second suspended beam suspended in parallel above the first electrode plate and a second connection anchored onto the stationary substrate. The diffraction modulator and the method for diffraction modulation are suitable to projection system.

14 Claims, 3 Drawing Sheets

(56) References Cited

U.S. PATENT DOCUMENTS

| | | | |
|---|---|---|---|
| 5,808,781 A * | 9/1998 | Arney et al. | 359/291 |
| 6,351,329 B1 * | 2/2002 | Greywall | 359/290 |
| 7,102,472 B1 * | 9/2006 | Nathanson et al. | 335/78 |
| 7,567,373 B2 * | 7/2009 | Chui et al. | 359/291 |
| 7,733,553 B2 * | 6/2010 | Faase et al. | 359/245 |
| 7,760,197 B2 * | 7/2010 | Faase et al. | 345/204 |
| 2008/0013145 A1 | 1/2008 | Chui et al. | 359/224 |
| 2008/0278788 A1 | 11/2008 | Sasagawa | 359/224 |

FOREIGN PATENT DOCUMENTS

| | | |
|---|---|---|
| CN | 1743892 A | 3/2006 |
| CN | 101498837 A | 8/2009 |
| JP | 2005-172853 A | 6/2005 |
| JP | 2009-134026 | 6/2009 |
| WO | WO2004071942 A1 | 8/2004 |

* cited by examiner

TRI WAVELENGTH DIFFRACTION MODULATOR AND A METHOD FOR MODULATION

CROSS-REFERENCE TO RELATED APPLICATIONS

This application is a continuation of International Application No. PCT/CN2010/080643, filed on Dec. 31, 2010, which claims the priority benefit of American Application No. 61/292,107, filed on Jan. 4, 2010. The contents of the above identified applications are incorporated herein by reference in their entirety.

FIELD OF THE TECHNOLOGY

The present invention relates to a tri wavelength diffraction modulator (TWDM) and a method of tri wavelength diffraction modulation, which belongs to the technology field of optical modulation device.

BACKGROUND

Optional modulators are solid state micro devices, which are widely used for microdisplay projection and other optical signal processing systems. Optional modulators can control or modulate an incident beam of light in a defined spatial pattern. The defined spatial pattern is correlated to a series of electrical inputs of image to the devices, through which the incident light beam can be modulated in intensity, phase, polarization or direction.

Two of the most commonly used classes of optical and particularly, spatial light modulators employ microelectromechanical system (MEMS) devices in a two dimensional array configured to provide two-dimensional modulation of incident light: Digital Micromirror Device (DMD) from Texas Instruments and the Grating Light Valve (GLV) device from Silicon Light Machines.

The appeal of the DMD has been evidenced in the widespread adoption, given its high optical efficiency, large etendue, wide bandwidth, high modulation speed and digitalized control algorithm for time sequential color combination and management. Despite its success in projection display applications, however, the DMD has been recognized with certain shortcomings, such as high power consumption per pixel, particularly for high resolution microdisplay projection applications in cellphone and handheld devices.

The GLV array devices based in fine reflective metal grids or elements are also recognized with significant appeal in etendue, analog grey-scaling, optical efficiency, modulation speed and particularly, power consumption per pixel. In a either linear or 2 dimensional configuration, a GLV array for modulating incident beams of light, the modulator comprising a plurality of grating elements, each of which includes a light reflective planar surface. Those grating elements are arranged parallel to each other with their light reflective surfaces parallel to each other. The modulator includes electrical-mechanical means for supporting the elements in relation to one another and means for moving the elements relative to one another so that elements move between a first configuration wherein the modulator acts to reflect the incident beam of light as a plane mirror, and a second configuration wherein the modulator diffracts the incident beam of light as it is reflected therefrom. In operation, the light reflective surfaces of the elements remain parallel to each other in both the first and the second configurations and the perpendicular spacing between the reflective surfaces of adjacent elements is equal to m/4 times the wavelength of the incident rays of light, wherein m is an even whole number or zero when the elements are in the first configuration and m is an odd number when the beam elements are in the second configuration.

The core idea of such a GLV modulator includes a reflective deformable grating light modulator, with a grating amplitude that can be controlled electronically, consisting of a reflective substrate with a deformable grating suspended above it. In its undeformed state, with no voltage applied between the elements of the grating and the substrate, the grating amplitude is one half of the wavelength of the incoming light. Since the round-trip path difference between the light reflected from the top and bottom of the grating is one wavelength, no diffraction occurs. When a voltage is applied between the grating elements and the substrate, the electrostatic force pulls the elements down to cause the grating amplitude to become one quarter of the wavelength so that reflections from the elements and the substrate add destructively, causing the light to be diffracted. If the detection system for the reflected light has a numerical aperture which accepts only the zero order beam, a mechanical motion of only one quarter of a wavelength is sufficient to modulate the reflected light with high contrast.

However, the wavelength dependency under a control algorithm with discrete states of light modulation and incident angle sensitivity due to diffraction are evident on the GLV devices disclosed in the prior art. Particularly for microdisplay projection applications, digitalized spatial modulation is desired for modulating illumination of wide incident angle over visible spectrum and in particular, in association with time sequential or spatial mosaic pattern color management schemes.

SUMMARY

The present invention provides a tri wavelength diffraction modulator and method of tri wavelength diffraction modulation, so that the modulating process is suitable to a projection system.

One aspect of the present invention provides a tri wavelength diffraction modulator, including:

a stationary substrate with a bottom electrode plate formed on top of the stationary substrate;

a first electrode plate comprising a first suspended beam suspended in parallel above the stationary substrate and a first connection anchored onto the stationary substrate; and a second electrode plate comprising a second suspended beam suspended in parallel above the first electrode plate and a second connection anchored onto the stationary substrate;

wherein: the second suspended beam of the second electrode plate comprises a reflecting layer and a dielectric layer, and at least one micro aperture opened in the reflecting layer; and the stationary substrate comprises a driving circuitry built inside the stationary substrate, the driving circuitry being adapted to provide electrical charge to the bottom electrode plate, the first electrode plate and the second electrode plate, respectively, so as to remain a relax distance, a pull-close distance and a pull-apart distance between the first suspended beam and the second suspended beam, respectively, within different time durations;

the pull-close distance being adapted to make illumination of a first wavelength in incident illumination pass through the micro aperture to form diffraction, the relax distance adapted to make illumination of a second wavelength in the incident illumination form diffraction, and the pull-apart distance being adapted to make illumination of a third wavelength in incident illumination form diffraction.

Another aspect of the present invention provides a method of tri wavelength diffraction modulation, including:

dividing the first duration into a first off duration and a first on duration;

driving the first electrode plate and the second electrode plate by the driving circuitry of the tri wavelength diffraction modulator to form a relative movement therebetween, and remain a relax distance between the first suspended beam and the second suspended beam during the second off duration so that the illumination of the second wavelength forms diffraction, but not remain the relax distance between the first suspended beam and the second suspended beam so that the illumination of the second wavelength forms reflection during reflection during the first on duration;

dividing the second duration into a second off duration and a second on duration;

driving the first electrode plate and the second electrode plate by the driving circuitry of the tri wavelength diffraction modulator to form a relative movement therebetween, and remain a relax distance between the first suspended beam and the second suspended beam during the second off duration so that the illumination of the second wavelength forms diffraction, but not remain the relax distance between the first suspended beam and the second suspended beam so that the illumination of the second wavelength forms reflection during the second on duration;

dividing the third duration into a third off duration and a third on duration;

driving the first electrode plate and the second electrode plate by the driving circuitry of the tri wavelength diffraction modulator to form a relative movement therebetween, and remain a pull-apart distance between the first suspended beam and the second suspended beam during the second off duration so that the illumination of the third wavelength forms diffraction, but not remain the pull-apart distance between the first suspended beam and the second suspended beam so that the illumination of the third wavelength forms reflection during the third on duration.

The diffraction modulator and the method for diffraction modulation in the present invention described above achieve the pulse width modulation (PWM) to the incident illumination by using diffraction, which benefits the integration of digitalized control algorithm and modulated composite wave, and achieves effective modulation for illumination of wide incident angle. Therefore, the diffraction modulator and the method for diffraction modulation are suitable to projection system.

BRIEF DESCRIPTION OF THE DRAWINGS

The drawings are not necessarily to scale, emphasis instead being placed upon illustrating the framework and principles of the disclosed invention.

DETAILED DESCRIPTION

In order to make the objects, technical solutions and merits of the present invention clearer, a further detailed description of embodiments of the present invention is given by reference to accompanying drawings. Furthermore, for purposes of clarity, part of the extended detail of those novel devices, that are widely known and are not relevant to the present invention, have been omitted from the following description.

Figure 1A:
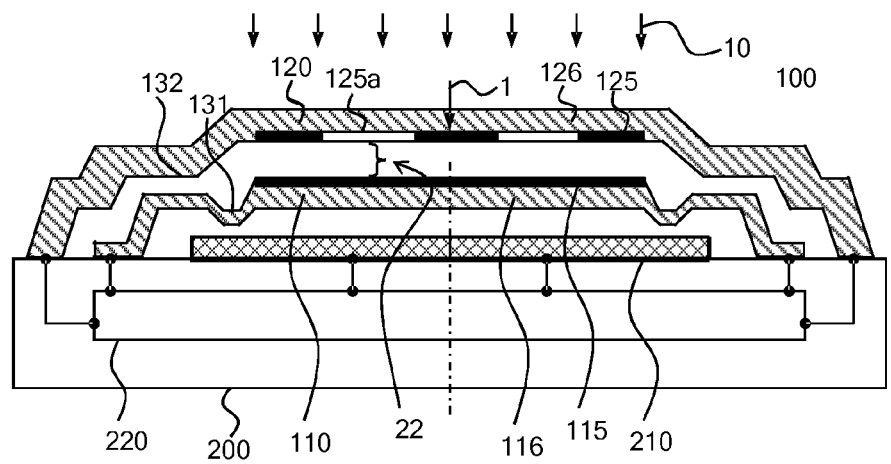
FIG. 1a is a cross sectional view of a tri wavelength diffraction modulator in one embodiment of the present invention, illustrating a first suspended beam remains a relax distance 22 to a second suspended beam.
Figure 1B:
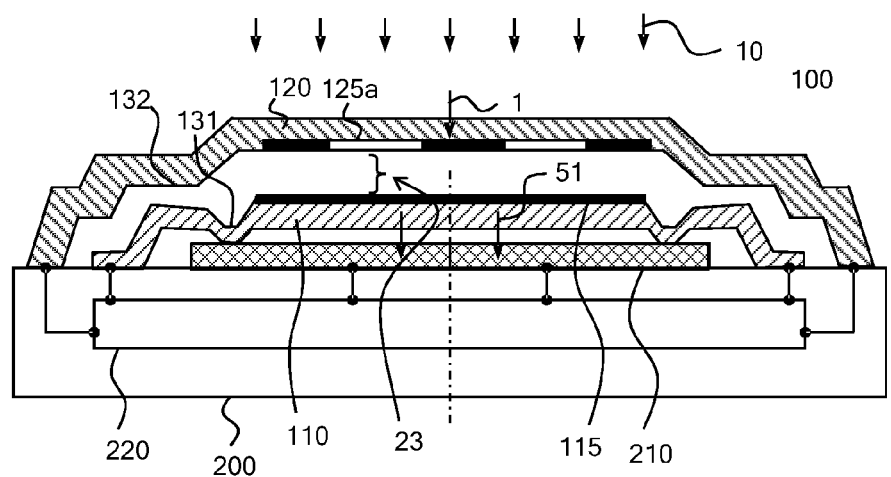
FIG. 1b is a cross sectional view of a tri wavelength diffraction modulator in one embodiment of the present invention, illustrating a first suspended beam remains a pull-apart distance 23 to a second suspended beam.
Figure 1C:
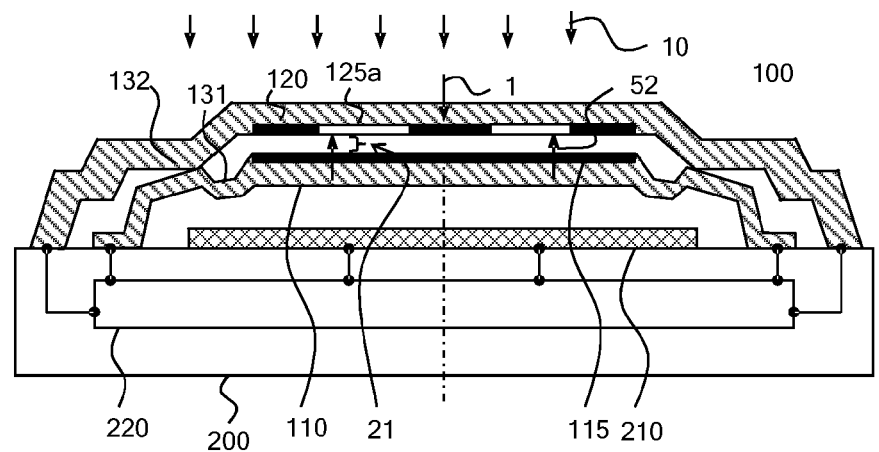
FIG. 1c is a cross sectional view of a tri wavelength diffraction modulator in one embodiment of the present invention, illustrating a first suspended beam remains a pull-close distance 21 to a second suspended beam.

As shown in FIGS. 1a-1c, the tri wavelength diffraction modulator (TWDM) 100 in this embodiment comprises a stationary substrate 200, a first electrode plate 110 and a second electrode plate 120.

A bottom electrode plate 210 is formed on a top of the stationary substrate 200; the first electrode plate 110 comprises a first suspended beam suspended in parallel to and above the stationary substrate 200 and a first connection anchored onto the stationary substrate 200; the second electrode plate 120 comprises a second suspended beam suspended in parallel above the stationary substrate 200 and a second connection anchored onto the stationary substrate 200.

The second suspended beam of the second electrode plate 120 comprises a second reflecting layer 125 and a second dielectric layer 126. At least one micro aperture 125a is opened in the second reflecting layer 125. The micro aperture 125a may be shaped in any close-loop geometric figure, such as circle, ring, ellipse, or polygon. The second electrode 120 can transmit incident illumination 10. The stationary substrate 200 further comprises a driving circuitry 220, the driving circuitry 220 is built inside the stationary substrate 200 and provides electrical charge individually to the bottom electrode 210, the first electrode plate 110 and the second electrode plate 120, so as to keep a relax distance 22, a pull-close distance 21, and a pull-apart distance 23 between the first suspended beam and the second suspended beam respectively within different time durations.

Specifically, as is shown in FIG. 1a, when electrical charge provided by the driving circuitry 220 is zero, the first suspended beam of the first electrode plate 110 remains a relax distance 22 to the second suspended beam of the second electrode plate 120. In addition, optionally, the relax distance 22 between the first suspended beam and the second suspended beam can also be kept when the electrostatic forces caused by electrical charge on the bottom electrode plate 210, the first electrode plate 110 and the second electrode plate 120 remains equilibrium.

As is shown in FIG. 1b, when the driving circuitry 220 provides opposite electrical charge to the first electrode plate 110 and the bottom electrode plate 210, the first electrode plate 110 moves to the bottom electrode plate 210 along a departing direction 51. A first spacing limiter 131 is configured on a bottom of the first electrode plate 110 protruding toward the bottom electrode plate 210, or on a top of the bottom electrode plate 210 protruding toward the first electrode plate 110. When the first electrode plate 110 moves to the bottom electrode plate 210, the first suspended beam of the first electrode plate 110 keeps the pull-apart distance 23 from the second suspended beam of the second electrode plate 120 by the spacing limitation of the first spacing limiter 131.

Optionally, the first spacing limiter 131 is mounted on a bottom of the first electrode plate 110 or is integrated with the first electrode plate 110, or is configured directly on a top of the bottom electrode plate 210.

As is shown in FIG. 1c, when the driving circuitry 220 provides opposite electrical charge to the first electrode plate 110 and the bottom electrode plate 210, the first electrode moves to the second electrode plate 120 along a closing direction 52. A second spacing limiter 132 is configured on a bottom of the second electrode plate 120 or a top of the first electrode plate 110. When the first electrode plate 110 moves to the second electrode plate 120, the first suspended beam of the first electrode plate 110 keeps the pull-close distance 21 from the second suspended beam of the second electrode plate 120 by the spacing limitation of the second spacing limiter 132.

Optionally, the second spacing limiter 132 is mounted on a bottom of the second electrode plate 120 or is integrated with the second electrode plate 120, or is configured directly on a top of the first electrode plate 110.

For achieving desired grey-scale control in a binary mode of pulse width modulation (PWM), the first suspended beam of the first electrode plate 110 keeps a relax distance 22, a pull-close distance 21, or a pull-apart distance 23 from the second suspended beam of the second electrode plate 120 respectively within different time durations. The pull-close distance 21 is used for making illumination of a first wavelength 91 in incident illumination 10 passing through the micro aperture 125a to form diffraction, the relax distance 22 is used for making illumination of a second wavelength 92 in incident illumination 10 form diffraction, and the pull-apart distance 23 is used for making illumination of a third wavelength 93 in incident illumination 10 form diffraction.

On the visible spectrum, the first wavelength 91 preferably corresponds to a chosen blue wavelength from 450 to 495 nm, the second wavelength 92 preferably corresponds to a chosen green wavelength from 495 to 570 nm, and the third wavelength 93 preferably corresponds to a chosen red wavelength from 620 to 750 nm.

Optionally, the bottom electrode plate 210 is made from any or combination of silver, aluminum, copper, titanium, platinum, gold, nickel and cobalt, or other metal material.

Optionally, the first suspended beam further comprises a first dielectric layer 116 and a first reflecting layer 115 formed on a top of the first dielectric layer 116, the first reflecting layer 115 is used for reflecting illumination that does not form diffraction and transmitting the illumination out of the second electrode plate 120. The first dielectric layer 116 and the first reflecting layer 115 can form a composite plate. The first dielectric layer 116 is made from any one or combination of silicon oxide, nitride and carbide, the first reflecting layer 115 is made from any or combination of silver, aluminum, copper, titanium, platinum, gold, nickel and cobalt.

In order to obtain the maximum contrast ratio when modulating diffraction, the size of the micro aperture 125a can be configured so that the reflectivity of a area on the first reflecting layer 115 corresponding to the micro aperture 125a is equal to the reflectivity of a area on the second reflecting layer 125 except the micro aperture 125a.

Optionally, the second suspended beam of the second electrode plate 120 further comprises a second reflecting layer 125 and a second dielectric layer 126. The second dielectric layer 126 is made from any one or combination of silicon oxide, nitride and carbide, the second reflecting layer 125 is made from any or combination of silver, aluminum, copper, titanium, platinum, gold, nickel and cobalt.

A method of tri wavelength diffraction modulation in some embodiments of the present invention will be introduced in the following description.

Figure 2A:
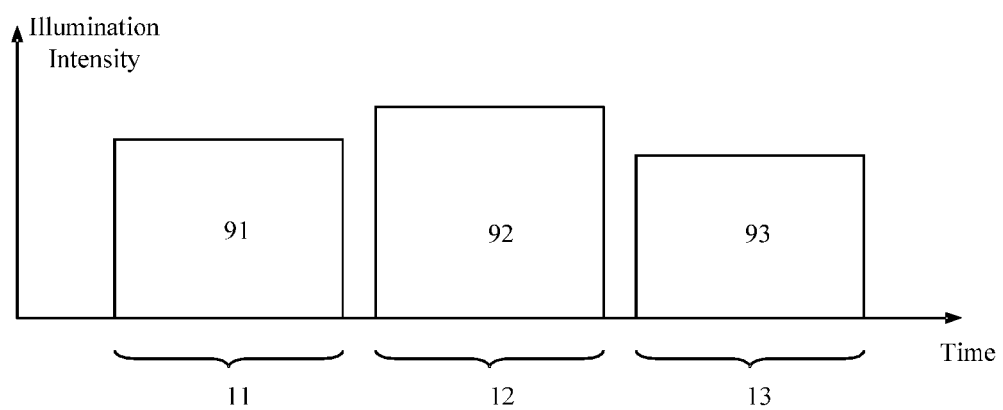
FIG. 2a is a schematic diagram showing a method of tri wavelength diffraction modulation in one embodiment of the present invention, illustrating the distribution of illustration intensity before modulating incident illumination 10.

As is shown in FIG. 2a, the incident illumination 10 in the present embodiment consists of illumination of the first wavelength 91 lasting for a first duration 11, illumination of the second wavelength 92 lasting for a second duration 12, and illumination of the third wavelength 93 lasting for a third duration 13. As is shown in FIG. 2a, the illumination of the first wavelength 91, the illumination of the second wavelength 92, and the illumination of the third wavelength 93 can have different illumination intensity.

Figure 2B:
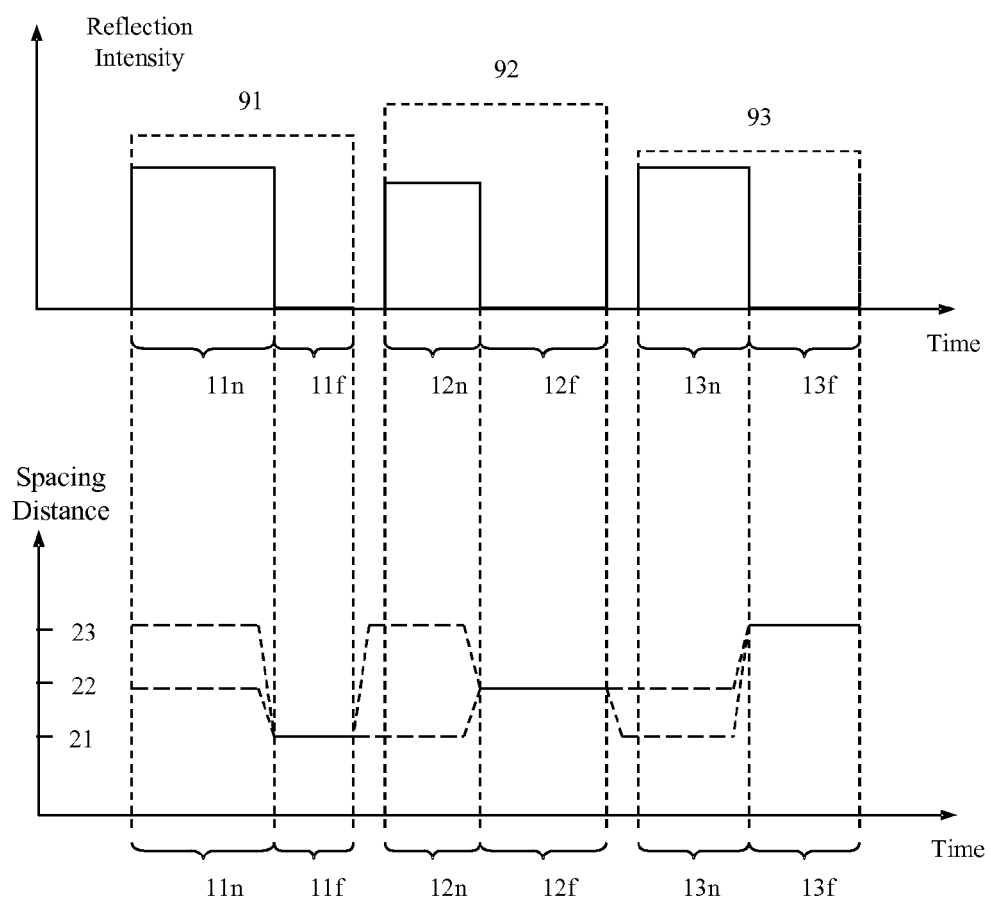
FIG. 2b is a schematic diagram showing a method of tri wavelength diffraction modulation in one embodiment of the present invention, illustrating the relations of the distance between a first suspended beam and a second suspended beam in the modulating process and the illumination intensity.

As is shown in FIG. 2b, the method comprises the following steps:

Step 111, dividing the first duration 11 into a first off duration 11f and a first on duration 11n;

Step 112, driving the first electrode plate 110 and the second electrode plate 120 by a driving circuitry 220 of the tri wavelength diffraction modulator 100 to form a relative movement, and remain a pull-close distance 21 between a first suspended beam of the first electrode plate 110 and a second suspended beam of the second electrode plate 120 during the first off duration 11f so that the illumination of the first wavelength 91 forms diffraction, but not remain the pull-close distance 21 between the first suspended beam and the second suspended beam so that the illumination of the first wavelength 91 forms reflection during the first on duration 11n.

Specifically, the illumination of the first wavelength 91 is reflected by the first reflecting layer 115 of a top of the first electrode plate 110 and transmits out of the second electrode plate 120.

Step 121, dividing the second duration 12 into a second off duration 12f and a second on duration 12n;

Step 122, driving the first electrode plate 110 and the second electrode plate 120 by the driving circuitry 220 of the tri wavelength diffraction modulator 100 to form a relative movement, and remain a relax distance 22 between the first suspended beam and the second suspended beam during the second off duration 12f so that the illumination of the second wavelength 92 forms diffraction, but not remain the relax distance 22 between the first suspended beam and the second suspended beam so that the illumination of the second wavelength 92 forms reflection during the second on duration 12n.

Specifically, the illumination of the second wavelength 92 is reflected by the first reflecting layer 115 of a top of the first electrode plate 110 and transmits out of the second electrode plate 120.

Step 131, dividing the third duration 13 into a third off duration 13f and a third on duration 13n;

Step 132, driving the first electrode plate 110 and the second electrode plate 120 by the driving circuitry 220 of the tri wavelength diffraction modulator 100 to form a relative movement, and remain a pull-apart distance 23 between the first suspended beam and the second suspended beam during the second off duration 13f so that the illumination of the third wavelength 93 forms diffraction, but not remain the pull-apart distance 23 between the first suspended beam and the second suspended beam so that the illumination of the third wavelength 93 forms reflection during the third on duration 13n.

Specifically, the illumination of the third wavelength 93 is reflected by the first reflecting layer 115 of a top of the first electrode plate 110 and transmits out of the second electrode plate 120. The first reflecting layer 115 and the second reflecting layer 125 of the present embodiments have a switching function between reflection and diffraction.

The diffraction modulator and the method for diffraction modulation in the embodiments of the present invention described above achieve the pulse width modulation (PWM) to the incident illumination 10 by using diffraction, which benefits the integration of digitalized control algorithm and modulated composite wave, and achieves effective modulation for illumination of wide incident angle. Therefore, the diffraction modulator and the method for diffraction modulation are suitable to projection system.

The method for fabricating such a diffraction modulator incorporates a state-of-art silicon-based thin film processing technology used for making modern MEMS devices in a multi-layer membrane configuration. The basic scheme of such fabrication employs forming a multiple membranes with specific spacing between thereof suspended above a planar substrate, as shown in FIG. 1a. Such fabrication involves first depositing and lithographically patterning a sacrificial thin film, then depositing and lithographically patterning a structural thin film as the membrane, and lastly but not finally, selectively removing the sacrificial thin film but leaving the membrane intact suspended above the substrate. By repeating the same scheme, such a modulator device with a multiple membranes suspended and spaced in well-defined spacing is fabricated similar to the skill disclosed in prior art in the area of thin film MEMS fabrication.

The present disclosure should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. A tri wavelength diffraction modulator, comprising:
a stationary substrate with a bottom electrode plate formed on top of the stationary substrate;
a first electrode plate comprising a first suspended beam suspended in parallel above the stationary substrate and a first connection anchored onto the stationary substrate; and
a second electrode plate comprising a second suspended beam suspended in parallel above the first electrode plate and a second connection anchored onto the stationary substrate,
wherein: the second suspended beam of the second electrode plate comprises a reflecting layer, a dielectric layer, and at least one micro aperture opened in the reflecting layer; and
the stationary substrate comprises a driving circuitry built inside the stationary substrate, the driving circuitry being adapted to provide electrical charge to the bottom electrode plate, the first electrode plate and the second electrode plate, respectively, so as to remain a relax distance, a pull-close distance and a pull-apart distance between the first suspended beam and the second suspended beam, respectively, within different time durations;
the pull-close distance being adapted to make illumination of a first wavelength in incident illumination pass through the micro aperture to form diffraction, the relax distance being adapted to make illumination of a second wavelength in the incident illumination form diffraction, and the pull-apart distance being adapted to make illumination of a third wavelength in incident illumination form diffraction.

2. The tri wavelength diffraction modulator according to claim 1, wherein the relax distance between the first suspended beam of the first electrode plate and the second suspended beam of the second electrode plate remains unchanged when the electrical charge provided by the driving circuitry is zero, or the electrical charge maintains an equilibrium of electrostatic force among the bottom electrode plate, the first electrode plate and the second electrode plate.

3. The tri wavelength diffraction modulator according to claim 1, wherein the first electrode plate is adapted to move towards the second electrode plate when the driving circuitry provides opposite electrical charges to the first electrode plate and the second electrode plate, respectively.

4. The tri wavelength diffraction modulator according to claim 3, wherein a spacing limiter is configured on a bottom of the second electrode plate or a top of the first electrode plate, the spacing limiter being adapted to maintain the pull-close distance between the first suspended beam of the first electrode plate and the second suspended beam of the second electrode plate when the first electrode plate is moving towards the second electrode plate.

5. The tri wavelength diffraction modulator according to claim 1, wherein the first electrode plate is adapted to move towards the bottom electrode plate when the driving circuitry provides opposite electrical charges to the first electrode plate and the bottom electrode plate, respectively.

6. The tri wavelength diffraction modulator according to claim 5, wherein a spacing limiter is configured on a bottom of the first electrode plate or a top of the bottom electrode plate, the spacing limiter being adapted to maintain the pull-apart distance between the first suspended beam of the first electrode plate and the second suspended beam of the second electrode plate when the first electrode plate is moving towards the bottom electrode plate.

7. The tri wavelength diffraction modulator according to claim 1, wherein the first wavelength, the second wavelength and the third wavelength correspond to: a chosen blue wavelength within blue color spectrum from 450 to 495 nm, a chosen green wavelength within green color spectrum from 495 to 570 nm, and a chosen red wavelength within red spectrum from 620 to 750 nm, respectively.

8. The tri wavelength diffraction modulator according to claim 1, wherein the bottom electrode plate is made from any one or a combination of silver, aluminum, copper, titanium, platinum, gold, nickel and cobalt.

9. The tri wavelength diffraction modulator according to claim 1, wherein the first suspended beam comprises another dielectric layer and another reflecting layer formed on a top of the another dielectric layer, the another reflecting layer being adapted to reflect and transmit illumination that does not form diffraction in the incident illumination out of the second electrode plate.

10. The tri wavelength diffraction modulator according to claim 9, wherein the another dielectric layer is made from any one or a combination of silicon oxide, nitride and carbide; and the another reflecting layer is made from any one or a combination of silver, aluminum, copper, titanium, platinum, gold, nickel and cobalt.

11. The tri wavelength diffraction modulator according to claim 1, wherein the micro aperture is shaped in a close-loop geometric figure.

12. The tri wavelength diffraction modulator according to claim 11, wherein the close-loop geometric figure is circle, ring, ellipse, or polygon.

13. The tri wavelength diffraction modulator according to claim 1, wherein the dielectric layer is made from any one or a combination of silicon oxide, nitride and carbide; and the reflecting layer is made from any one or a combination of silver, aluminum, copper, titanium, platinum, gold, nickel and cobalt.

14. A method of tri wavelength diffraction modulation by using the tri wavelength diffraction modulator according to claim 1 to modulate the incident illumination, wherein the incident illumination consists of: illumination of the first wavelength lasting for a first duration, illumination of the second wavelength lasting for a second duration, and illumination of the third wavelength lasting for a third duration, the method comprising:

dividing the first duration into a first-off duration and a first-on duration;

driving the first electrode plate and the second electrode plate by the driving circuitry of the tri wavelength diffraction modulator to form a relative movement therebetween, and maintaining the pull-close distance between the first suspended beam of the first electrode plate and the second suspended beam of the second electrode plate during the first-off duration so that the illumination of the first wavelength forms diffraction, but not maintaining the pull-close distance between the first suspended beam and the second suspended beam so that the illumination of the first wavelength forms reflection during the first-on duration;

dividing the second duration into a second-off duration and a second-on duration;

driving the first electrode plate and the second electrode plate by the driving circuitry of the tri wavelength diffraction modulator to form a relative movement therebetween, and maintaining the relax distance between the first suspended beam and the second suspended beam during the second-off duration so that the illumination of the second wavelength forms diffraction, but not maintaining the relax distance between the first suspended beam and the second suspended beam so that the illumination of the second wavelength forms reflection during the second-on duration;

dividing the third duration into a third-off duration and a third-on duration; and driving the first electrode plate and the second electrode plate by the driving circuitry of the tri wavelength diffraction modulator to form a relative movement therebetween, and maintaining the pull-apart distance between the first suspended beam and the second suspended beam during the third-off duration so that the illumination of the third wavelength forms diffraction, but not maintaining the pull-apart distance between the first suspended beam and the second suspended beam so that the illumination of the third wavelength forms reflection during the third-on duration.

* * * * *